United States Patent
Nguyen et al.

(10) Patent No.: US 10,244,111 B1
(45) Date of Patent: Mar. 26, 2019

(54) SYSTEM FOR PROVIDING DATA TO AN INTERACTIVE RESPONSE SYSTEM

(71) Applicant: AMAZON TECHNOLOGIES, INC., Seattle, WA (US)

(72) Inventors: Luan Khai Nguyen, Auburn, WA (US); William Alexander Strand, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 137 days.

(21) Appl. No.: 15/359,143

(22) Filed: Nov. 22, 2016

Related U.S. Application Data

(63) Continuation of application No. 14/491,804, filed on Sep. 19, 2014, now Pat. No. 9,538,005.

(51) Int. Cl.
  *H04M 1/64* (2006.01)
  *H04M 3/493* (2006.01)
  *H04M 3/42* (2006.01)
  *H04L 29/08* (2006.01)

(52) U.S. Cl.
  CPC ............ *H04M 3/493* (2013.01); *H04L 67/22* (2013.01); *H04M 3/42357* (2013.01)

(58) Field of Classification Search
  CPC ........................... H04M 3/4936; H04M 3/493
  USPC ........................................ 379/88.01, 88.18
  See application file for complete search history.

(56) References Cited

U.S. PATENT DOCUMENTS

| | | | | |
|---|---|---|---|---|
| 6,885,737 B1 * | 4/2005 | Gao | ...................... | H04M 3/493 370/352 |
| 8,000,454 B1 * | 8/2011 | Or-Bach | ................ | G06Q 20/10 379/100.14 |
| 8,494,126 B2 * | 7/2013 | Skinner | ................... | H04M 1/64 379/88.18 |
| 9,100,478 B1 * | 8/2015 | Benway | ................ | H04M 3/493 |
| 2009/0296908 A1 | 12/2009 | Lee et al. | | |
| 2015/0172463 A1 * | 6/2015 | Quast | .................. | H04M 3/4936 379/88.01 |
| 2015/0215455 A1 * | 7/2015 | Perotti | .................. | H04M 3/493 379/88.01 |

OTHER PUBLICATIONS

Huynh, Van D., "Non-Final Office Action dated Feb. 3, 2016", U.S. Appl. No. 14/491,804, The United States Patent and Trademark Office, Feb. 3, 2016.
Huynh, Van D., "Notice of Allowance dated Aug. 30, 2016", U.S. Appl. No. 14/491,804, The United States Patent and Trademark Office, Aug. 30, 2016.

* cited by examiner

*Primary Examiner* — Van D Huynh
(74) *Attorney, Agent, or Firm* — Lindauer Law, PLLC

(57) ABSTRACT

Described are techniques for exchanging data, in an automated manner, with an automated system, such as an Interactive Voice Response (IVR) system. Data may be exchanged with the automated system via a data connection, separate from a telecommunication connection. User data responsive to requests received from the system via the data connection, or user data that corresponds to the identity of the system, may be automatically provided. A telecommunication connection may be initiated during or subsequent to the exchange of data via the data connection. A notification may be provided to a user responsive to receipt of audio data via the telecommunication connection, or a change in the received audio data.

20 Claims, 8 Drawing Sheets

US 10,244,111 B1

SYSTEM FOR PROVIDING DATA TO AN INTERACTIVE RESPONSE SYSTEM

CROSS-REFERENCE TO RELATED APPLICATION

This application is a continuation of, and claims priority to, U.S. patent application Ser. No. 14/491,804 filed Sep. 19, 2014, entitled "Automated Response System". Application Ser. No. 14/491,804 is incorporated by reference herein in its entirety.

BACKGROUND

A large variety of businesses use interactive voice response systems to receive and direct incoming communications from users. For example, many users contacting a business via telephone may be requested to navigate a series of verbally-presented menus or to provide requested information responsive to audio prompts, using voice commands, dual tone multi-frequency (DTMF, or "touch tone") buttons, or similar audible responses. Users that interact with multiple interactive voice response systems are often requested to provide the same or similar information to more than one system. The number of options, ongoing prompts for information, and so forth, may result in an adverse user experience.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
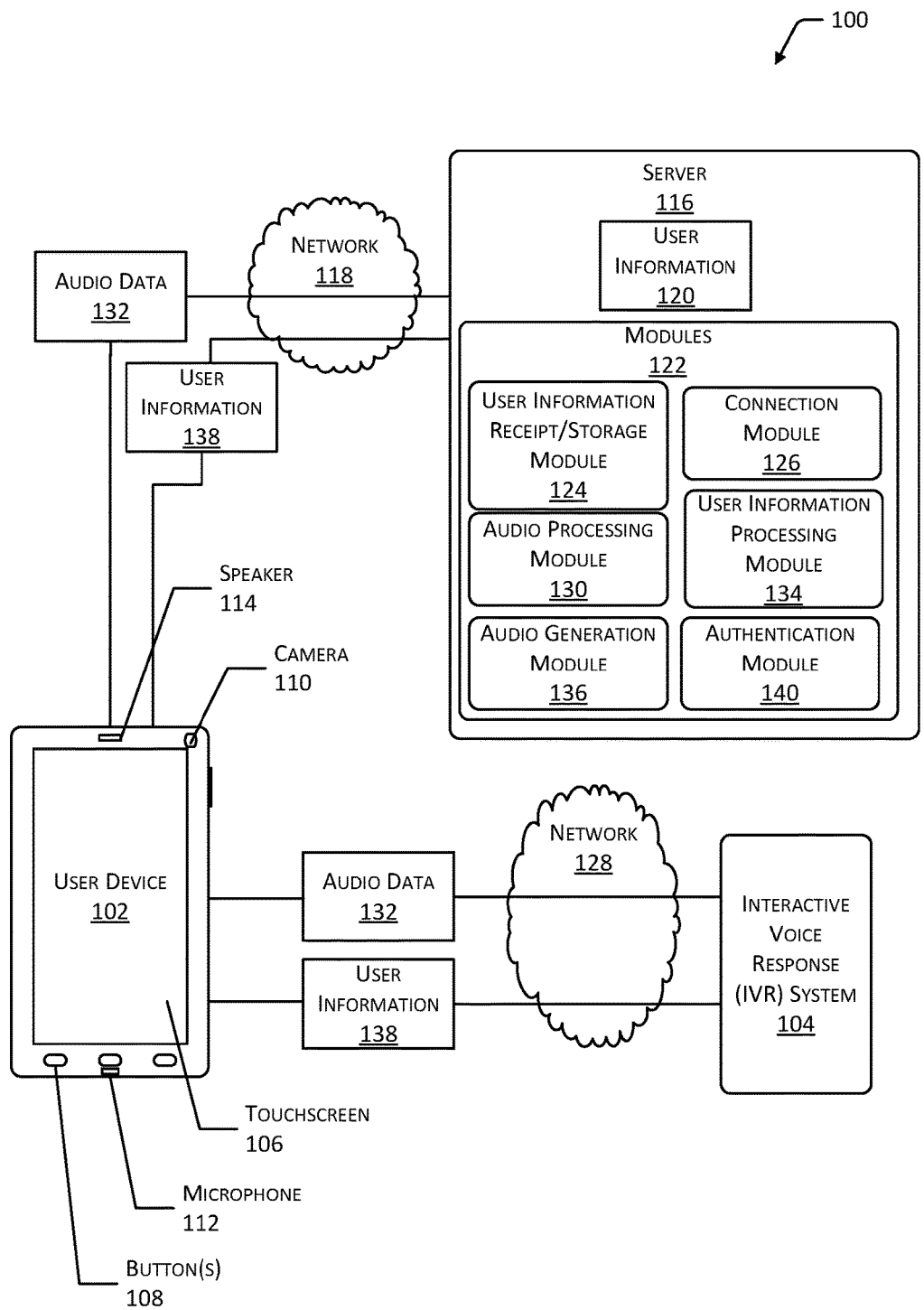
FIG. 1 is an illustrative system depicting a user device configured for communication with an automated system, including an interactive voice response system.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than a mandatory sense (i.e., meaning must). Similarly, the words "include," "including," and "includes" mean including, but not limited to.

DETAILED DESCRIPTION

Interactive voice response (IVR) systems enable businesses to respond, in an automated manner, to incoming communications and to deliver automated outgoing communications. An IVR system serves the same function as one or multiple human receptionists or phone operators. For example, use of an IVR system enables users initiating communication with the business or receiving communication from the business to direct and categorize their own communications, guided by a series of automated requests for information. For example, an IVR system may audibly instruct a user to press a certain dual tone multi-frequency (DTMF, or "touch tone") button on a telephone or speak a verbal command (e.g., into the microphone of a telephone) to indicate a preferred spoken language for the duration of the communication. An IVR system may also present a series of numbered menus (e.g., delivered by a synthesized or recorded voice) to which a user may respond using DTMF buttons or signals, verbal responses, or another means of input such as text, data generated via a Voiceover-Internet-Protocol (VoIP) connection, and so forth. Through the use of IVR systems, communications may be categorized, evaluated, and directed to appropriate departments or individuals within a business in the absence of human interaction. Typically, a larger volume of communications may be undertaken in a more efficient and streamlined manner through the use of an IVR system than what would be possible using conventional person-to-person communications.

In some implementations, an IVR system may request that a user provide one or more items of information prior to the direction of the communication to an appropriate resolution, department, or individual. For example, a user may be asked to provide an account number, name, date of birth, social security number, address, password, description of the reason for initiating the communication, or various other items of information specific to the user or the user's current circumstances, using DTMF buttons, verbal responses, or other similar means of input. While numerical buttons, common to most telephones, are suitable for entry of numeric responses and some alphanumeric or alphabetic responses, voice recognition and natural language processing software may enable words and sentences spoken by a user to be analyzed, and relevant or responsive information extracted therefrom. Use of verbal responses by a user may allow for safer or more convenient, "hands-free" operation of a user device.

Many IVR systems, spanning a variety of businesses, request identical or similar information from users, such as identifying or demographic information. While use of IVR systems generally facilitates increased volume and efficiency for many businesses, a user may often dedicate a significant quantity of time to the task of interacting with an IVR system. As such, implementations described in the present disclosure relate to systems, methods, and computer readable media usable to provide information to and receive information from IVR systems and other types of automated systems. In some implementations, a user may exchange information with an IVR system in at least a partially automated manner. For example, some implementations may provide information to an IVR system in the absence of specific interaction or input by a user. Other implementations may provide information to an IVR system using a lesser degree of user interaction when compared to direct communication between a user and an IVR system.

A user device (e.g., tablet computer or a smartphone) may be used to access an IVR system. User information may be received and stored, either locally in fixed or removable data storage associated with a user device, or remotely in data storage (memory) in networked communication with the user device, and so forth. User information may include information commonly requested when interacting with an IVR system, such as a user's name, date of birth, social security number, one or more account numbers, one or more passwords, and so forth. For example, a touchscreen of a smartphone could be used to input user information. In other implementations, one or more buttons, microphones, cameras, keyboards, or similar input devices may be used.

Upon a user device connecting to an IVR system, audio data, such as verbal prompts delivered using a synthesized or recorded voice, may be received by the user device from the IVR system. Verbal prompts or other data received by the user device from the IVR system may be processed to identify a request for information. At least a portion of the user information corresponding to the request for information may be determined, and the corresponding portion(s) of the user information may be provided to the IVR system. In some implementations, the determined portion(s) of the user information may be provided to an automated system as computer signals (e.g., raw data). In other implementations, audio data may be generated using the determined portion(s) of the user information, such as by producing DTMF tones or a recorded or synthesized voice representative of the portion(s) of the user information. The audio data may then be provided to the IVR system, which may receive the audio data in the same manner that DTMF tone or spoken responses would be received from a human user.

It should be noted that implementations described herein are not limited to interaction with IVR or other automated systems. For example, a user may initiate or receive a telecommunication connection, or access a previously established telecommunication connection, with any external party including an IVR system, a human operator, other types of automated systems, and so forth. For example, a Public Switched Telephone Network (PSTN) or VoIP call may be established, data may be sent or transmitted using a Transmission Control Protocol (TCP) or User Datagram Protocol (UDP) connection, or other means of exchanging data may be used. Audio data, including human speech, audio telecommunication, video chat, and so forth, may be received via this connection and processed to determine a request for information. User information may then be accessed and provided responsive to the request for information. In some implementations, when communicating with a human operator, audio data, such as a synthesized voice or recorded voice, may be generated using the user information. Alternatively, items of user information previously input as audio data may be accessed. The audio data may be provided via the telecommunication connection.

In some implementations, information may be provided to an automated system responsive to the identity of the system, itself, in addition to or in lieu of providing information responsive to received audio data. Upon connection to an automated system, whether initiated by the automated system, a user attempting to contact the automated system, or whether an existing connection is accessed by either the automated system or a user device, an identity of the automated system may be determined. The identity of the automated system may be determined, for example, by identifying a telephone number or Internet address associated therewith or by receiving audio data or other data therefrom and determining one or more items of audio data usable to identify the automated system. In some implementations, an in-band telecommunication signal may be received from the automated system. For example, the in-band telecommunication signal may comprise a DTMF tone or an instruction to generate the DTMF tone that is included with the audio data of the communication. The communication signal may provide information indicative of the identity of the automated system.

After identifying the automated system, user information corresponding to the identity of the automated system may be provided thereto. While the user information provided to the automated system is determined using the identity of the automated system, the user information may also correspond to audio data, such as verbal prompts or other requests for information, received from the automated system. In some implementations, upon accessing a connection to an automated system and determining the identity of the automated system, preexisting information related to the automated system may be known or accessible. Preexisting information may include information provided by an owner or operator of the automated system, determined by previous communication with the automated system, and so forth. For example, preexisting information may include a known sequence of DTMF tones or verbal responses used to navigate an IVR system. Responsive to the identification of the automated system, user information may be provided in the form of DTMF tones, voice data, or other audio data, to achieve a desired result through interaction with the IVR system. The provided user information may correspond to the audio data received from the IVR system, even though the received audio data may not necessarily have been processed or analyzed when determining the items of user information to be provided to the automated system.

FIG. 1 is an illustrative system 100, which includes a user device 102 usable to access an Interactive Voice Response (IVR) system 104 or other external party. While the depicted user device 102 is shown as a smartphone, it should be understood that any manner of device able to establish a connection with an IVR system, any other type of automated system, with a human operator, and so forth, may be used. User devices 102 may include, but are not limited to, a desktop computer, laptop computer, tablet computer, personal computer, automotive computer, gaming console, electronic (e-book) reader, smartphone, a non-cellular telephone (e.g., a "land line" or "plain old telephone service" (POTS) device), and other similar user devices. The user device 102 is shown having a touchscreen 106, which operates both as an input device and as an output device. The user device 102 also includes a plurality of buttons 108, a camera 110, and a microphone 112, which are also usable to provide input to the user device 102. The user device 102 further includes a speaker 114, usable to provide audio output. In operation, a user may provide input using the touchscreen 106, buttons 108, camera 110, or microphone 112 for the purpose of interacting directly with the user device 102 or to transmit the input from the user device 102 to a remote device, such as the IVR system 104. In various implementations, an external keyboard, mouse, scanner, or other types of peripheral input devices may be directly or wirelessly placed in communication with the user device 102 and used to provide input. Additionally, one or more location sensors or motion sensors may provide input to the user device 102. Location sensors may include, but are not limited to, radio navigation-based systems such as terrestrial or satellite-based navigational systems. The satellite-based navigation system may include one or more of a Global Positioning System (GPS) receiver, a global navigation satellite system (GLONASS) receiver, a Galileo receiver, an Indian Regional Navigational Satellite System, and so forth. Motion sensors may include, but are not limited to, gyroscopes, accelerometers, and so forth. In one implementation, input may be provided to the user device 102 from a separate device. Output from the user device 102 may be provided locally to a user via the touchscreen 106 and speaker 114, or output from the user device 102 may be provided using any manner of external display, speaker, printer, or haptic elements. Output may be provided remotely via transmission to a remote device.

While FIG. 1 depicts the user device 102 in communication with an IVR system 104, it should be understood that implementations usable within the scope of the present disclosure may communicate with any manner of external party. Other types of external parties may include devices operated by human operators, text-based chat interfaces either operated by humans or automated systems, video chat interfaces, or any other manner of recipient or device capable of providing data to and receiving data from the user device 102.

The depicted user device 102 is shown in communication with a server 116 via a network 118. The network 118 may include a public network such as the Internet, private network such as an institutional or personal intranet, or a combination thereof. The network 118 may include, but is not limited to, a personal area network (PAN), local area network (LAN), wide area network (WAN), and so forth. The network 118 may communicate using Ethernet, Wi-Fi®, Bluetooth®, ZigBee®, 3G, 4G, or other technologies. The depicted server 116 may be representative of any number of servers or computing devices that have processors, data storage media, and communication interfaces. The depicted network 118 may be representative of any type or number of networks, intermediate devices, or connections. Additionally, while the system 100 shown in FIG. 1 includes a server 116, in various implementations, one or more components, modules, or data shown associated with the server 116 may be stored locally on the user device 102, such as on fixed or removable data storage associated therewith. As such, the server 116 is representative of any combination of local or remote data storage media accessible by the user device 102.

FIG. 1 depicts user information 120 stored in association with the server 116, and various modules 122 to receive, store, and process the user information 120 and data received from the user device 102 and IVR system 104. User information 120 may include information commonly requested when interacting with an IVR system, such as a user's name, date of birth, social security number, one or more account numbers, one or more passwords, and so forth. User information may include, without limitation, alphanumeric strings, DTMF tones, or recorded audio information, and may be received via any manner of input device or user interface. The user information 120 may include data input to the user device 102, prior to establishing communication with the IVR system 104 or during communication with the IVR system 104.

The user information receipt/storage module 124 may include executable instructions for enabling the server 116 to receive items of user information 120 from the user device 102 and store the user information 120 in memory. For example, a user device 102 may provide to the server 116 one or more account numbers, passwords, a social security number, an address, a date of birth, a name, and other types of identifying information, for future or contemporaneous access and retrieval. In some implementations, the user information 120 may include data collected by the server 116. For example, the server 116 may, periodically or continuously, query the user device 102 to obtain a user's preferred language, browsing history, search query history, purchasing history, and similar types of information. In some implementations, the user information 120 may include data automatically generated by the user device 102 and periodically or continuously transmitted to or collected by the server 116. For example, the user device 102 may include location sensors; motion sensors; gyroscopes; hardware or software usable to determine temperature, humidity, or other weather conditions; the presence or absence of emergent conditions; the presence or absence of various physical features, service providers, businesses, and so forth; and other status information, which may be provided to the server 116. In some implementations, the user information 120 may include data specific to one or more IVR systems 104, such as a series of DTMF tones or verbal responses usable to achieve certain resolutions. In some implementations, the user information 120 may include data corresponding to multiple users, such as information provided to a specific IVR system 104 through previous interactions with the IVR system 104 by various users. Each item of user information 120 may be flagged, categorized, classified, or otherwise prepared and stored in a manner that facilitates querying of the user information 120 as well as future access and retrieval of specific items thereof, via execution of the user information receipt/storage module 124.

The server 116 is further shown having a connection module 126, which may include executable instructions usable to establish and maintain communication between the user device 102 and the IVR system 104. For example, FIG. 1 depicts the user device 102 in communication with the IVR system 104 via a network 128. While FIG. 1 depicts the network 128 as a separate network from the network 118 through which the user device 102 and the server 116 communicate, in various implementations, the networks 118 and 128 could be the same network. In some implementations, one or both networks 118, 128 could include some manner of network-independent connection between devices. In various implementations, the connection module 126 may be used to initiate a connection with the IVR system 104 using the user device 102, receive a connection initiated by the IVR system 104, or to access a preexisting connection between the user device 102 and the IVR system 104.

The server 116 is also shown having an audio processing module 130, which may include executable computer instructions usable to analyze audio data 132 received from the IVR system 104. Audio data 132 includes verbal prompts, DTMF tones, synthesized speech, recorded speech, and so forth. FIG. 1 depicts audio data 132 received by the user device 102 from the IVR system 104 and provided from the user device 102 to the server 116 for analysis using the audio processing module 130. In various implementations, the audio processing module 130 may include any manner of natural language processing software, voice recognition software, speech-to-text software, and so forth, usable to identify a request for information within the audio data 132. For example, the audio data 132 may include a verbal prompt requesting that a user enter an account number. The audio processing module 130 may be used to recognize at least a portion of the audio data 132 as a request associated with one or more items of user information 120.

The user information processing module 134 may include executable computer instructions usable to analyze the user information 120 to determine at least a portion thereof that corresponds to the request for information. In some implementations, the user information 120 may be flagged, categorized, or otherwise organized in a manner that enables access and retrieval of portions thereof responsive to a request for information. For example, an item of user information 120 may be categorized or flagged as a "social security number" and responsive to a request for information relating to a user's social security number, this item of user information 120 may be accessed by the server and retrieved for transmission to the IVR system 104. Alternatively, the user information 120 may be queried, to identify portions responsive to the request for information. The user information 120 may be queried by searching for specific terms such as alphanumeric strings, a specific size or length, a range of sizes or lengths, one or more formats, and so forth. For example, upon receipt of a request for information relating to a social security number, the user information 120 may be queried to locate ten-digit numeric strings.

In some implementations, the determined portion of the user information 120 may be provided directly from the user device 102 to the IVR system 104. In other implementations, an audio generation module 136 may be used to generate audio data 132 representative of the portion(s) of the user information 120 determined to correspond to the request for information. Some items of user information 120 may be input from the user device 102 as audio data 132, in which case the audio generation module 136 may simply access existing audio data 132. The portion of the user information 120 determined to correspond to the request for information may then be provided to the IVR system 104 or other external party. For example, as shown in FIG. 1, a portion of the user information 138 may be transmitted from the server 116 to the IVR system 104 via the user device 102.

The server 116 is also shown having an authentication module 140, which receives authentication data from the user device 102. For example, prior to providing one or more items of user information 120, having a security flag associated therewith, to the IVR system 104, the server 116 may request provision of authentication data from the user device 102.

Figure 2:
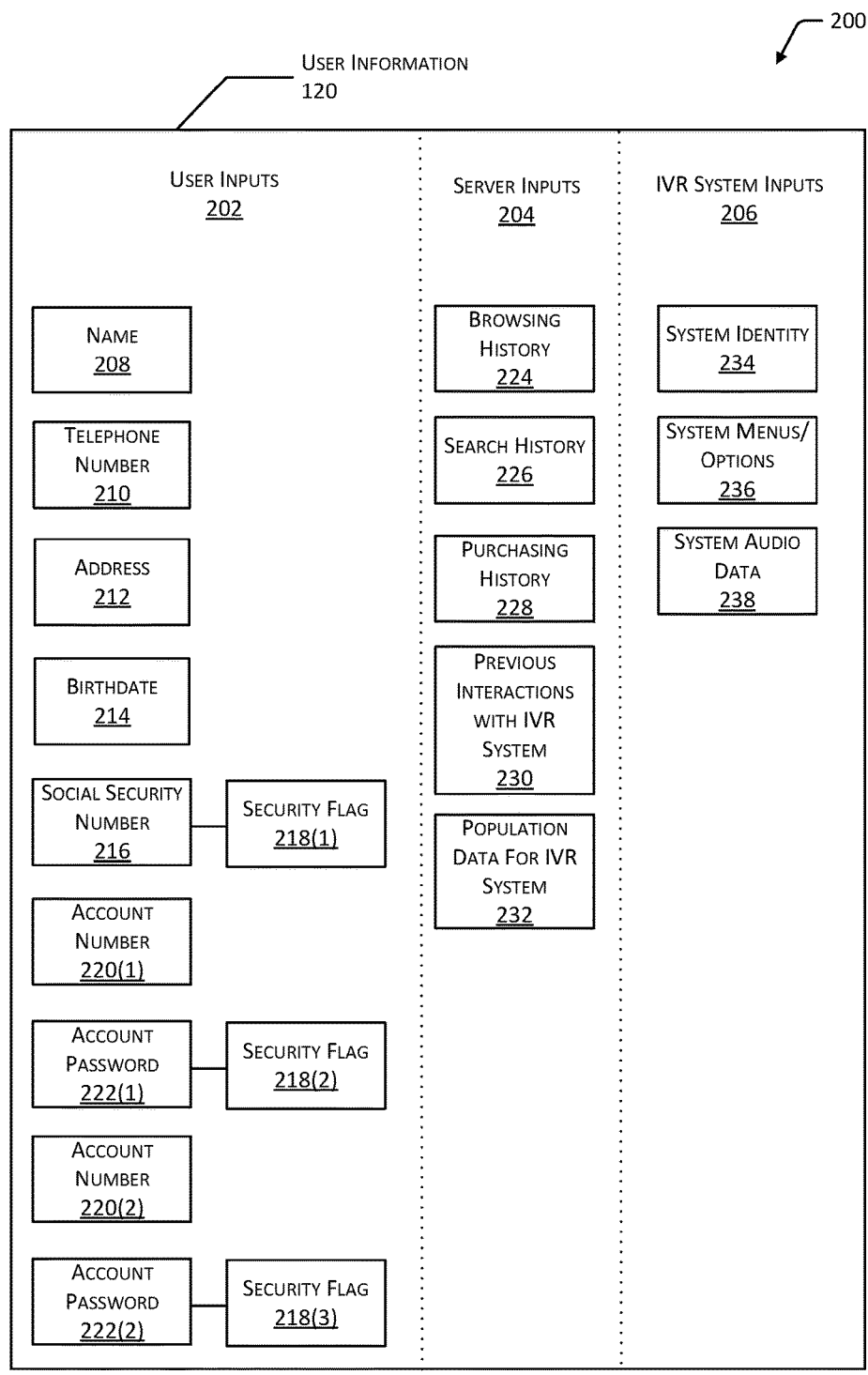
FIG. 2 illustrates an implementation of user information usable within the scope of the present disclosure.

FIG. 2 depicts a block diagram 200, showing an implementation of the user information 120, illustrating various data objects that may be included therein. Conceptually, the block diagram 200 shown in FIG. 2 is divided into user inputs 202, server inputs 204, and IVR system inputs 206. User inputs 202 may include items of data input by a user device 102. Server inputs 204 may include items of data obtained or input by a server 116. IVR system inputs 206 may include items of data obtained or input by an IVR system 104 or another external party. However, the specific delineation between items of user information 120 is merely one implementation, and any of the data may be obtained from any source. For example, input to the server 116 may be by a user device 102 or IVR system 104, discovered by the server 116 via a query of a user device 102 or IVR system 104, or determined by the server 116 through processing of preexisting data.

Items of user information 120 may include items of information commonly requested when interacting with an IVR system 104 or other external party, such as a user's name 208, telephone number 210, address 212, birthdate 214, and social security number 216. FIG. 2 depicts the social security number 216 associated with a security flag 218(1). For example, in some implementations, it may be undesirable for a social security number 216 to be automatically provided to an IVR system 104 without first authenticating the user or obtaining authorization therefrom. The authentication module 140 (shown in FIG. 1) may include computer-executable instructions to identify the presence or absence of a security flag 218 for each item of user information 120. The authentication module 140 may also include computer-executable instructions to actively request authentication data, such as through a prompt provided to the user device 102, to passively obtain authentication data, and to provide the associated item(s) of user information 120 to an IVR system 104 responsive to receiving the authentication data. By way of example, a user may be prompted to provide a password, a gesture, or a fingerprint using a touchscreen 106. A user may also be prompted to provide facial recognition using one or more cameras 110, voice recognition using one or more microphones 112, or any other security feature or combination of security features. The received authentication data may be processed and verified. For example, the received authentication data may be compared to preexisting or expected authentication data to determine a match. If the authentication process is successful, the item(s) of data associated with the security flag 218 may be provided to the IVR system 104.

Other depicted items of user information 120 include a first account number 220(1), a first account password 222(1) having a security flag 218(2) associated therewith, a second account number 220(2), and a second account password 222(2) having a security flag 218(3). In some implementations, each of the security flags 218(1)-(3) may be generally identical, requiring the same authentication data, or one or more of multiple possible items of authentication data. In other implementations, one or more security flags 218 may correspond to different levels of security. For example, the security flag 218(1) associated with the social security number 216 may require receipt of a password form a user device 102 prior to transmitting data representing the social security number 216 to an IVR system 104, while the security flags 218(2) and (3) associated with the account passwords 222(1) and (2), respectively, may require performance of facial or voice recognition prior to transmitting the associated items of data to an IVR system 104.

In some implementations, the security flags 218 may be provided or removed by a user, using a user device 102. In other implementations, certain types of information may automatically be provided with a security flag 218. For example, items of user information 120 having a certain flag, category, content, format, or size may be determined by the server 116, and a security flag 218 may be associated therewith.

In some implementations, the items of user information 120 may be received by the server 116 prior to establishing communication with an IVR system 104 and then accessed or retrieved at a future time responsive to requests for information from the IVR system 104 or other external party. In some implementations, an IVR system 104 may request an item of information not present in the user information 120. For example, an IVR system 104 may request an account number 220 or account password 222 for an account that has not been received by the server 116, or another item of data that has not been received from a user or otherwise determined by the server 116. As such, in certain implementations, a user may be prompted to provide one or more items of information contemporaneously, such as during communication between the user device 102 and the IVR system 104.

While the implementation shown in FIG. 2 depicts a number of data objects as user inputs 202, it should be understood that one or more of the depicted user input data objects may be determined by the server 116. For example, a user's telephone number 210, address 212, and birthdate 214 may be determined through a search of publicly available records or a previously-created user account associated with the server 116 or with any other device or system accessible to the server 116.

Certain items of user information 120 may not necessarily be input by a user, but may instead be determinable by the server 116. For example, FIG. 2 depicts data objects including a user's browsing history 224, search history 226, and purchasing history 228. In some implementations, various items of user-specific historical information, such as browsing histories 224, search histories 226, or purchasing histories 228, may be processed to determine portions that may be provided to an IVR system 104 or other external party responsive to a request for information. Other depicted data objects include pervious interactions with the IVR system 230. For example, if a specific user has pressed a sequence of DTMF buttons to reach a particular business' customer service department on each previous occasion that the user interacted with the IVR system 104 associated with that business, this information may be used to determine an appropriate automatic response to be provided to the IVR system 104 by the user device 102. FIG. 2 also depicts population data for the IVR system 232, which may include previous interactions between one or more other users and the IVR system 104. For example, if 98% of users that reside in a specific user's state indicated a preferred language of English when interacting with a specific IVR system 104, this information may be used to determine an automated response when the IVR system 104 provides a request for information relating to the preferred language of the specific user.

While the implementation shown in FIG. 2 depicts a number of data objects as server inputs 204, it should be understood that one or more of the depicted server input data objects may be input by a user device 102, an IVR system 104, or obtained through other means. For example, a user may input, via a user device 102, a preferred language, a preferred objective when contacting a specific business or IVR system 104, or previous browsing history 224 manually, or an IVR system 104 may provide a history of previous user interactions with the IVR system 104.

Certain items of user information 120 may be provided by or obtained from an IVR system 104. For example, the implementation shown in FIG. 2 depicts a system identity 234, system menus/options 236, and system audio data 238 as data relevant to an IVR system 104. In some implementations, a system identity 234 may be used by a server 116 to obtain other information relevant to an IVR system 104. By way of example, when an identity of an IVR system 104 is known, other information relevant to that specific IVR system 104, such as items of data responsive to various requests for information, may be publicly available or obtainable by processing preexisting data. When the configuration or sequence of the system menus/options 236 is known, responsive items of user information 120 may be provided to the IVR system 104 independent of the audio data 132 or requests received therefrom. When system audio data 238 used by an IVR system 104 is known, received audio data 132 may be compared to the system audio data 238 during communication with IVR systems 104 to determine an identity of an IVR system 104 or other relevant information.

While the implementation shown in FIG. 2 depicts a number of data objects as IVR system inputs 206, it should be understood that one or more of the depicted IVR system input data objects may be input by a user device 102, determined or input by a server 116, or obtained through other means. For example, the identity of an IVR system 104 may be determined by the server 116 using a telephone number or Internet address used to establish communication with the IVR system 104. The system menus/options 236 or system audio data 238 may also be input by a user device 102 or determined by processing publicly available information or preexisting information relating to user interactions with the IVR system 104.

Figure 3:
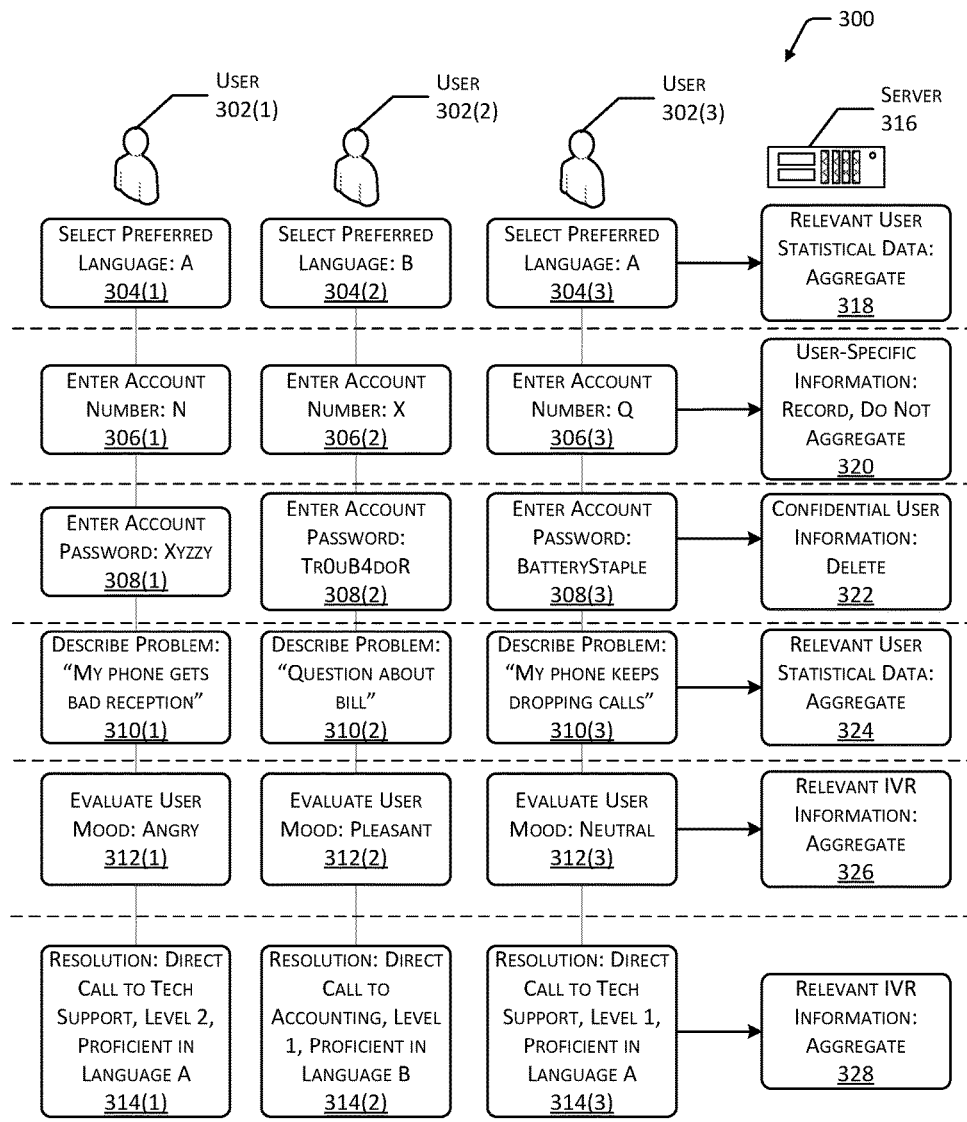
FIG. 3 illustrates a method for generating user information.

FIG. 3 is a diagram 300 illustrating one implementation to determine, aggregate, generate, or otherwise obtain user information 120 from a population of users. Specifically, FIG. 3 depicts interactions of three users with a single IVR system 104; however, it should be understood that the concepts illustrated in FIG. 3 may be applicable to a population of users of any size and that the small number of elements associated with each user may be representative of any number of elements, interactions, or information.

FIG. 3 depicts a first user 302(1) selecting preferred language 304(1) of A, which may be performed by providing DTMF tones or a verbal response to an IVR system 104. For example, a user may press button #1 on a touch tone phone to indicate a preferred language of English or speak verbal response stating "English" responsive to a request from the IVR system 104. The user 302(1) may then be prompted to enter an account number 306(1), such as an alphanumeric string or the name of an account, using DTMF tones or spoken words. A user may also be prompted to enter an associated account password 308(1). For example, the user 302(1) may enter "N" as account number 306(1) and "Xyzzy" as the account password 308(1). In the depicted implementation, the IVR system 104 may then prompt the user 302(1) to describe a problem 310(1). For example, the user 302(1) may describe the problem 310(1) by stating "My phone gets bad reception." In some implementations, the IVR system 104 may include speech analysis or speech recognition software to evaluate the mood 312(1) of the user 302(1). For example, the IVR system 104 may evaluate the mood 312(1) of user 302(1) as "angry" based on the volume, tone, pitch, or pace of the user's 302(1) voice or based on specific language provided by the user 302(1), which may be identified through use of phonetic indexing or similar speech recognition techniques. Responsive to the information provided by the user 302(1), the IVR system 104 may direct the communication of the user 302(1) toward a resolution 314(1) corresponding to the user information 120 received. For example, FIG. 3 depicts a resolution 314(1) in which the user 302(1) is directed to a "tech support, level 2" based on the problem 310(1) and evaluation of the user's mood 312(1). The resolution 314(1) will also direct the user 302(1) to an individual proficient in language A based on the selected preferred language 304(1).

A second user 302(2) may select a preferred language 304(2) of B, provide an account number 306(2) of "X", provide an account password 308(2) of "Tr0uB4doR", and provide a description of a problem 310(2) of "Question about bill". The IVR system 104 may evaluate the mood 312(2) of user 302(2) based on the tone, pitch, pace, volume of the user's 302(2) voice or language provided by the user 302(2), such as through use of phonetic indexing or other forms of speech recognition, and responsive to the information provided by user 302(2), a resolution 314(2) may be determined by the IVR system 104. For example, the resolution 314(2) by the IVR system 104 may direct the user 302(2) to an "accounting" department based on the problem 310(2) and to "level 1" of the "accounting" department based on an evaluation of the mood 312(2) of user 302(2) as "pleasant". Additionally, the resolution 314(2) may direct the user 302(2) to an individual proficient in language B based on the selected preferred language 304(2) of user 302(2).

A third user 302(3) may select a preferred language 304(3) of A, provide an account number 306(3) of "Q", provide an account password 308(3) of "BatteryStaple", and provide a description of a problem 310(3) as "My phone keeps dropping calls". The IVR system 104 may evaluate the mood 312(3) of the user 302(3) as "neutral" based on the volume, tone, pitch, or pace of the user's 302(3) voice or language provided by the user 302(3), such as through use of phonetic indexing or other types of speech recognition. In some implementations, a mood 312(3) of "neutral" may be determined when a mood is unable to be determined from the voice or language provided by the user 302(3). Responsive to information provided by the user 302(3), a resolution 314(3) may be determined by the IVR system 104. For example, the IVR system 104 may direct the user 302(3) to the "tech support" department based on the problem 310(3) and to "level 1" of the "tech support" department, based on the evaluation of the mood 312(3) of the user 302(3) as "neutral". Additionally, the resolution 314(3) may direct the user 302(3) to an individual proficient in language A, based on the selected preferred language 304(3) of user 302(3).

In various implementations, each of the items of information provided by the users 302 may be recorded by a server 316 and aggregated. Aggregated information may be stored as user information relevant to future interactions with the IVR system 104 or as information relevant to the IVR system 104, useful for future interactions therewith. Items of information provided by the users 302 may also be recorded, for example, as information specific to an individual user 302, though not necessarily aggregated as information relevant to interactions of other users 302 with the IVR system 104. Information provided by the users 302 may also be recognized as confidential information that may be disregarded or deleted.

By way of example, in the depicted implementation, each of the selected preferred languages 304(1)-(3) may be recognized as relevant user statistical data 318 by the server 316 and aggregated. During future interactions with the IVR system 104, the fact that the majority of the depicted users 302(1)-(3) selected a preferred language 304 of "A" may be usable in generating an automated response to the IVR system 104 responsive to a request for information relating to a preferred language 304. Individual items of user information 120 may not necessarily be used in isolation. For example, through analysis of existing user data, a server 316 may determine that the majority of users 302 communicating using a telephone number having a first area code indicated a certain preferred language 304, while disregarding the preferred language 304 indicated by users 302 having a telephone number with a different area code.

Account numbers 306(1)-(3) are recognized by the server 316 as user-specific information 320 and recorded, though not necessarily aggregated. For example, recording an individual user's 302 account number 306 would enable that account number 306 to be provided, automatically, during future interactions with the IVR system 104, responsive to a request for information relating to the user's 302 account number 306. However, it is unlikely that a specific user's 302 account number 306 would be relevant during the interactions of any other user 302 with the IVR system 104.

FIG. 3 further depicts the entered account passwords 308(1)-(3) as being recognized by the server 316 as confidential user information 322, to be deleted. In some implementations, for security purposes, it may be desirable to refrain from recording confidential user information 322 that may potentially damage a user 302 if provided, in an automated manner. In other implementations, confidential user information 322, such as an account password 308, may be recorded as user-specific information 320, but an associated security flag 218 may be applied, such that authentication data is requested from the user 302 prior to transmitting the account password 308. In other implementations, an account password 308 or similar confidential information may be recorded locally on the user device 102 and accessed by the server 116 responsive to a request for information relating to a user's 302 account password 308, thereby avoiding storage of confidential user information 322 at a location potentially accessible to others.

Each of the provided descriptions of problems 310(1)-(3) may be recognized by the server 316 as relevant user statistical data 324, to be aggregated. For example, if a large majority of users 302 communicate with an IVR system 104 express technical problems appropriate for communication with a technical support professional, this information may be used to generate a response to a request for information relating to the nature of a problem 310. In some implementations, items of user information 120 may be used to generate a user interface that may be presented to a user 302 to indicate possible resolutions 314 that a user 302 may seek. For example, when the sequence of responses necessary to reach both the technical support and account departments of a business is known, a user 302 may be presented with a simplified user interface containing a choice of departments. Selection of either department may result in the submission of automated responses to the IVR system 104, suitable to direct the user 302 to the selected department.

FIG. 3 further depicts the evaluations of the moods 312(1)-(3) of the users 302(1)-(3), respectively, as being recognized as relevant IVR information 326 to be aggregated, and the resolutions 314(1)-(3) reached by each user 302 also being recognized as relevant IVR information 328 to be aggregated. In the depicted example, the effects an evaluated mood on the ultimate resolution, and the information provided to reach the resolution 314 itself (which may include the totality of the user information 120 provided to the IVR system) 104, may be used to determine subsequent responses to requests for information from the IVR system 104. For example, it may be determined that user 302 responses recognized as "angry" may result in the IVR system 104 immediately directing the user 302 to "level 2" personnel rather than base level personnel. As such, automated responses to the IVR system 104 may also be provided in a manner that simulates anger to achieve a resolution 314 in which "level 2" personnel are reached immediately. Similarly, if certain keywords in a spoken response exhibit a greater likelihood for a user 302 to be directed toward a certain resolution 314, responses including such keywords may be used to achieve a targeted resolution 314. In other implementations, identification of a user's mood 312 may be omitted, and a resolution 314 may be reached using the other information provided or determined.

The concepts illustrated in FIG. 3, especially when applied to a large population of users 302, may enable each of the possible resolutions 314 achievable when communicating with an IVR system 104 to be known, and the most probable sequence of responses to be provided to achieve each resolution 314. For example, when a user 302 intending to contact the technical support department of a business initiates communication with an IVR system 104, the selected preferred language 304 and account number 306 may be provided automatically, with no interaction required by the user 302. The account password 308 of the user 302 may be provided after the user 302 submits passive or active authentication data. An automated response may then be provided to the IVR system 104 using known keywords that will reach the technical support department of the business, in a tone simulating anger to result in a resolution 314 that bypasses the base level of technical support, to place the user 302 in communication with supervisory-level personnel. With the exception of initiating the communication and the provision of authentication data, this process may be accomplished with little to no user-interaction. In some implementations, the user device 102 may then provide a notification to the user 302 once the automated process has concluded. For example, the user device 102 may notify the user 302 that the automated process has concluded when the user 302 is placed in a queue to speak with a technical service individual. In some implementations, the user device 102 may provide the notification upon receipt of a human voice.

Figure 4:
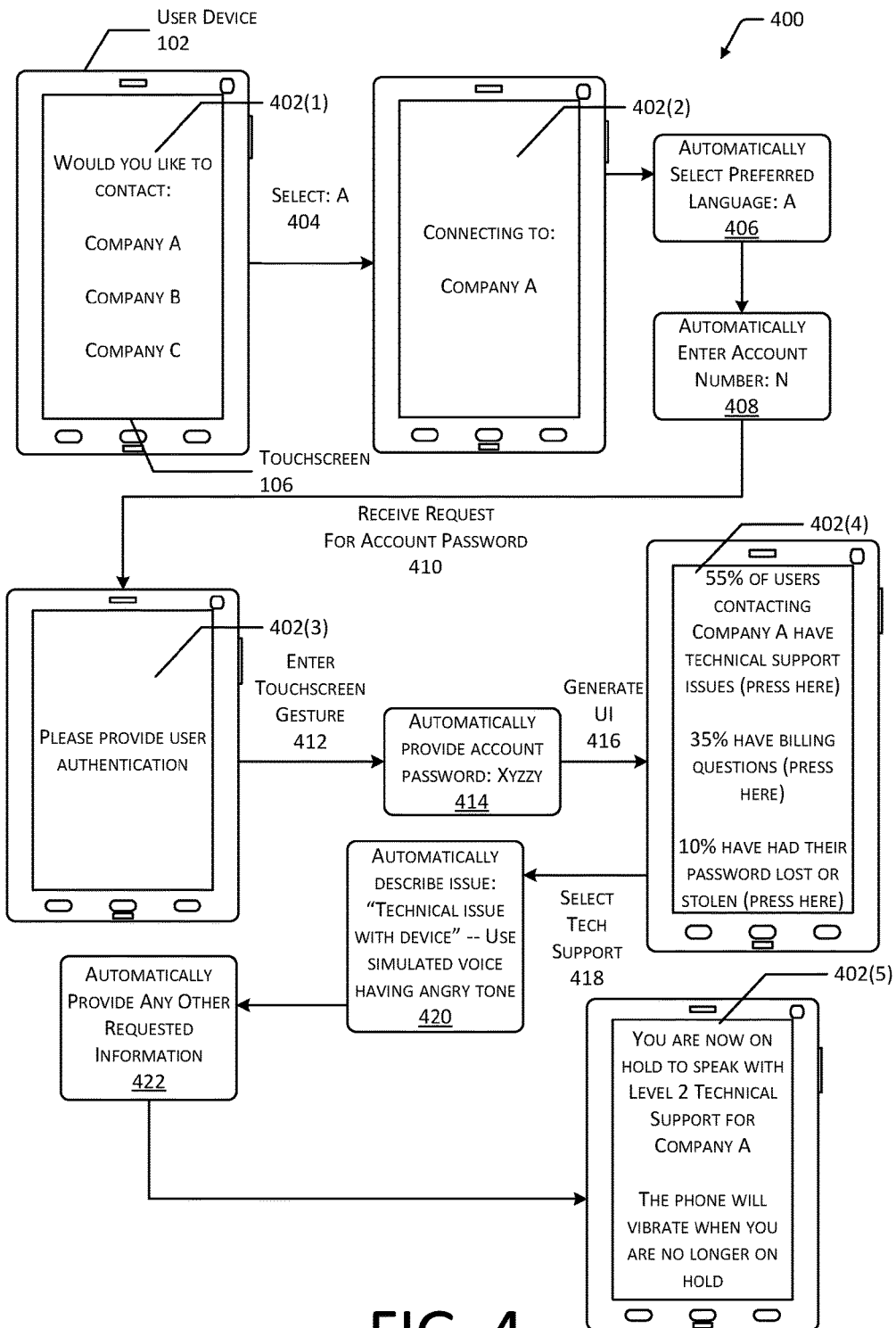
FIG. 4 illustrates one possible implementation of a user interface, shown over time, usable within the scope of the present disclosure.

FIG. 4 illustrates a flow diagram of an implementation 400 of one possible user interface (UI) within the scope of the present disclosure. The depicted UI is shown over a period of time to illustrate the interaction of user 302 with the implementation. The user device 102 is shown having a touchscreen 106 for interaction by a user 302. In the first screen 402(1) of the depicted interface, the touchscreen 106 may be used to display a list of companies, such that a user 302 may initiate communication with any of the listed companies by using the touchscreen 106 to select from the list. While in some embodiments, a user 302 may initiate communication with an IVR system 104 or other external party simply by dialing a telephone number, connecting to an Internet address, and so forth, in other embodiments, a list of companies may be provided to a user 302 to initiate communication. For example, the list of companies provided in the first screen 402(1) may be determined based on the current location of the user 302, the user's 302 browsing history 224, search history 226, purchasing history 228, or other similar data specific to the user 302, the user's 302 location, or to other users 302. For example, data specific to the user 302 may include a list of contacts stored on the user device 102. While the first screen 402(1) lists three companies, in various implementations, any number of options may be listed. A list may also include a button, field, or other element by which a user 302 may input a name 208, telephone number 210, or other information to attempt to initiate communication with an entity not listed on the first screen 402(1).

The depicted implementation illustrates receipt of a selection of Company A 404. Following this selection 404, a second screen 402(2) is illustrated indicating the selection of Company A. The user device 102 may then initiate communication with an IVR system 104 associated with Company A and begin receiving and processing data therefrom as well as automatically providing responses to the requests for information. Block 406 illustrates automatically selecting a preferred language, such as by transmission of DTMF signals, synthesized or recorded voice, or other types of data to the IVR system 104. For example, a user's 302 preferred language 304 of "A" may be recorded in the server 116 due to previous interactions between the user device 102 and the current IVR system 104 or other IVR systems 104, language settings on the user device 102, the current location of the user device 102, and so forth. Block 408 illustrates automatically entering an account number. For example, a user's 302 account number 220 with Company A may be previously recorded, after being input during previous interactions between the user device 102 and the IVR system 104. In some implementations, a user 302 may store data using an electronic wallet. The electronic wallet may comprise one or more data structures configured to store information including, but not limited to, account numbers 220 for multiple entities, demographic data, identification data, and so forth. For example, the identification data may comprise the user's 302 name 208, address 212, telephone number 210, social security number 216, and so forth. Information stored by the electronic wallet may be accessed and provided to IVR systems 104 in response to requests for information.

After automatically entering the account number 408, the user device 102 may receive a request for an account password 410. In the depicted implementation, an account password 222 may be classified as confidential user information 322. A third screen 402(3) is depicted displaying a request for user authentication on the touchscreen 106. Responsive to a receipt of a touchscreen gesture 412 or other types of authentication data, such as a password 222, a fingerprint, facial recognition, voice recognition, and so forth, the account password 308 may be automatically provided 414 to the IVR system 104.

A UI may be generated 416 using various items of user information 120, such as data specific to the user 302 or user device 102, data specific to the IVR system 104, data determined from multiple users 302, and so forth. In the depicted implementation, a fourth screen 402(4) displays a list of possible resolutions 314. For example, the screen 402(4) indicates "55% of users contacting Company A have technical support issues," "35% have billing questions," and "10% have had their password lost or stolen." The specific options listed in the UI may be determined by using data relating to a population of users 302, such as the most common resolutions 314 sought by users 302 that have previously interacted with the IVR system 104. In some implementations, data relating to the resolutions 314 sought and achieved by users 302 may be provided by the IVR system 104. In other implementations, the options listed in the UI may be determined using data relating to the specific user 302 or user device 102. For example, the options listed in the UI may include the most common resolutions 314 sought by the user device 102 when interacting with the current IVR system 104 or other IVR systems 104, possible or likely resolutions 314 determined based on the user's 302 current location or other information relating to user 302, and so forth. While the screen 402(4) lists three possible resolutions 314, in various implementations, any number of options may be listed, and a list may also include a button, field, or other element by which a user 302 may indicate that none of the listed resolutions 314 are applicable, in which case, the user device 102 may be used to interact with the IVR system 104 in an at least partially manual manner.

In the depicted implementation, the user device 102 may be used to indicate a selection of "tech support" 418. Responsive to subsequent requests for information received from the IVR system 104, the user device 102 may automatically provide a sequence of information that will result in the selected resolution 314. For example, block 420 depicts automatically providing a description of an issue: "Technical issue with device," using a simulated voice having an angry tone. The response provided to the IVR system 104 may be configured to include keywords or other data likely to provoke the selected resolution 314. Other aspects of the response, such as a simulated mood, may be provided to further pursue a desired resolution 314, such as a supervisory level of support responsive to use of a simulated voice having an angry tone. It should be understood that the implementation shown in FIG. 4 is primarily conceptual, and that any number of requests for information may be received from an IVR system 104. Block 422 automatically provides any other requested information. In various implementations, if a request for information is received for which no corresponding user information 120 may be determined, the user device 102 may receive a prompt or notification, requesting input by a user 302 to provide the requested information.

A fifth screen 402(5) is depicted indicating the resolution 314 that is received from the IVR system 104. For example, the screen 402(5) indicates that the user device 102 has been placed in a queue to speak with "Level 2 Technical Support for Company A." In some implementations, a user 302 could manually remain in a queue until provided with an opportunity to interact with a human operator; however, in other implementations, the user device 102 may be configured to provide a notification, such as a sound, vibration, visual effect, and so forth, upon detection of a human operator or other change in the data received by the user device 102. For example, after being placed in a queue to speak with a technical support representative for Company A, the user device 102 may be configured to vibrate once a human operator is detected in place of the IVR system 104.

Figure 5:
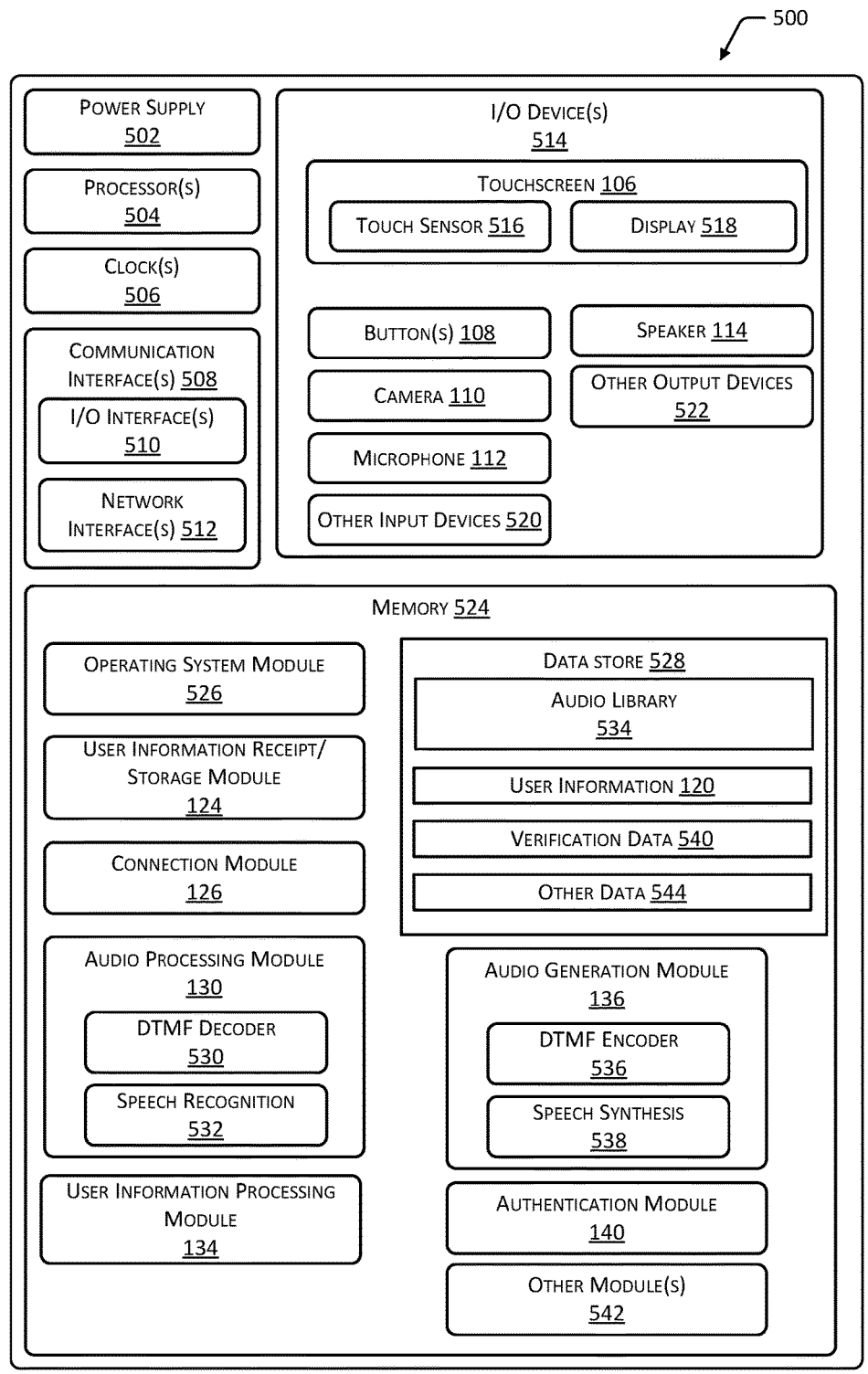
FIG. 5 is a block diagram of one or more computing devices usable within the scope of the present disclosure.

FIG. 5 illustrates a block diagram of a computing device 500 that is configured to support operation of the system 100. In various implementations, the depicted computing device 500 may be the user device 102, the IVR system 104 or other type of system associated with an external party, the server 116, or any manner of other device in communication with the user device 102, server 116, or IVR system 104 and configured to provide data thereto.

One or more power supplies 502 may be configured to provide electrical power suitable for operating the components in the computing device 500. In some implementations, the power supply 502 may comprise a rechargeable battery, fuel cell, photovoltaic cell, power conditioning circuitry, and so forth.

The computing device 500 may include one or more hardware processors 504 (processors) configured to execute one or more stored instructions. The processors 504 may comprise one or more cores. One or more clocks 506 may provide information indicative of date, time, ticks, and so forth. For example, the processor 504 may use data from the clock 506 to generate a timestamp, trigger a preprogrammed action, and so forth.

The computing device 500 may include one or more communication interfaces 508 such as input/output (I/O) interfaces 510, network interfaces 512, and so forth. The communication interfaces 508 may enable the computing device 500, or components thereof, to communicate with other devices or components. The I/O interfaces 510 may comprise interfaces such as Inter-Integrated Circuit (I2C), Serial Peripheral Interface bus (SPI), Universal Serial Bus (USB), RS-232, HDMI, TOSLINK®, Bluetooth®, and so forth. The I/O interface(s) 510 may couple to one or more I/O devices 514. The I/O devices 514 may include input devices such as one or more of a touchscreen 106, which includes a touch sensor 516 and a display 518, one or more buttons 108, camera 110, microphone 112, keyboard, mouse, scanner, and other input devices 520. The I/O devices 514 may also include output devices, such as the display 518 of the touchscreen 106, one or more speakers 114, haptic output devices, printers, and other output devices 522. In some implementations, the I/O devices 514 may be physically incorporated with the computing device 500 or may be externally placed.

The network interface 512 may be configured to provide communications between the computing device 500 and other devices, such as the I/O devices 514, user devices 102, servers 116, other computing devices 500, web-based resources, other severs 116, routers, wireless access points, network access satellites, cellular towers, and so forth. The network interface 512 may include wireless functions, devices configured to couple one or more networks including PANs, LANS, wireless LANs, WANs, wireless WANs, and so forth. The computing device 500 may also include one or more busses or other internal communications hardware or software that allow for the transfer of data between the various modules and components of the computing device 500.

As shown in FIG. 5, the computing device 500 includes one or more memories 524. The memory 524 may comprise one or more computer-readable storage media (CRSM). The CRSM may be any one or more of an electronic storage medium, a magnetic storage medium, an optical storage medium, a quantum storage medium, a mechanical computer storage medium, and so forth. The memory 524 provides storage of computer-readable instructions, data structures, program modules, and other data for the operation of the computing device 500. A few example functional modules are shown stored in the memory 524, although the same functionality may alternatively be implemented in hardware, firmware, or as a system on a chip (SoC).

The memory 524 may include at least one operating system (OS) module 526. The OS module 526 is configured to manage hardware resource devices such as the I/O interfaces 510, the network interfaces 512, and the I/O devices 514, and provide various services to applications or modules executing on the processors 504. The OS module 526 may implement a variant of the FreeBSD™ operating system as promulgated by the FreeBSD Project; a UNIX™ or UNIX-like operating system; a variation of the Linux™ operating system as promulgated by Linus Torvalds; the Windows® operating system from Microsoft Corporation of Redmond, Wash., USA; or other operating systems.

Also stored in the memory 524 may be a data store 528 and one or more of the following modules. These modules may be executed as foreground applications, background tasks, daemons, and so forth. The data store 528 may use a flat file, database, linked list, tree, executable code, script, or other data structure to store information. In some implementations, the data store 528 or a portion of the data store 528 may be distributed across one or more other devices including the computing devices 500, the user device 102, server 116, network attached storage devices, and so forth.

For example, the memory 524 may store the user information receipt/storage module 124, which may be configured for data acquisition, such as from one or more of the I/O devices 514. In some implementations, the user information receipt/storage module 124 may perform some processing of the user information 120. For example, audio data 132 acquired by the microphone 112 may be processed to detect DTMF tones, vocal inflections, and so forth. Alphanumeric data acquired by the touchscreen 106 may be processed to generate DTMF tones, simulated voices, and so forth. Items of data acquired by any of the I/O devices 514 may be recognized or flagged as confidential, and associated security flags 218 and authentication data may be acquired. Image data, such as facial recognition data, acquired by the camera 110 may be processed to detect and characterize facial features present in the image data. In one implementation, image processing may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. For example, the OpenCV library may be used to detect faces, determine a relative position of facial fiducials such as eyes, mouth, and nose, and so forth.

The connection module 126 may be configured to establish communications with one or more of other computing devices 500, the I/O devices 514, or other devices. The communications may be authenticated, encrypted, and so forth.

The audio processing module 130 may be configured to receive and process audio data 132, such as sounds received from an IVR system 104, a human operator, and so forth. The depicted audio processing module 130 may include a DTMF decoder module 530 to recognize DTMF tones present in received data. In some implementations, the DTMF decoder module 530 may extract the DTMF tones from the audio data 132 for separate processing or storage, flag the DTMF tones for recognition by other modules, convert the DTMF tones to data usable by other modules such as numeric or alphanumeric text, and so forth. The audio processing module 130 may also include a speech recognition module 532, which may include one or more types of natural language processing software, speech-to-text software, or similar programs usable to determine identifiable portions of audio data 132. The identifiable portion of the audio data 132 may include words, phrases, vocal inflections indicative of emotional state, and so forth. In various implementations, the audio processing module 130 may be used in conjunction with an audio library 534 stored in the data store 528. The audio library 534 may contain audio data to which received audio data 132 may be compared to facilitate identification and processing of all or a portion of the received audio data 132.

The user information processing module 134 may be configured to query the user information 120 stored in the data store 528, e.g., responsive to requests for information identified by the audio processing module 130 by processing received audio data 132. For example, the user information processing module 134, the user information receipt/storage module 124, or both the user information processing module 134 and the user information receipt/storage module 124 may be used to flag, categorize, or otherwise store the user information 120 in a manner that enables identification of specific items of data as relevant to specific requests for information. An item of user information 120, flagged as a social security number 216 may be provided to an IVR system 104 responsive to a request for information containing the language "social security number." In one implementation, the user information processing module 134 may query the user information 120 using text or image-recognition software, or the audio processing module 130 for items of user information 120 stored as audio data 132, to determine items of user information 120 that correspond to a received request for information. For example, the user information processing module 134 may compare items of user information 120 to a received request for information to identify like or corresponding portions, or to a library of data to identify portions of the user information 120 that are likely to contain certain types of data, including ten characters of numeric text that may be identified as a potential social security number, numeric strings beginning with three numbers that correspond to an area code of the location where the user 302 resides may be identified as a potential telephone number, and so forth.

The audio generation module 136 may be used to generate audio data 132 using at least a portion of the user information 120, including portion(s) of the user information 120 determined by the user information processing module 134 to correspond to a request for information identified by the audio processing module 130. In some implementations, portion(s) of user information 120 may be provided to an IVR system 104 or other destination without requiring the generation of audio data 132. For example, one or more items of user information 120 may be received as audio data 132, including, but not limited to, DTMF tones, a user's voice, and so forth. Alternatively, some IVR systems 104 or other destinations may be configured to receive data types other than audio data 132, such as text, images, or video data. In other implementations, the audio generation module 136 may include a DTMF encoder module 536 to generate DTMF tones, or a signal containing or simulating DTMF tones, for transmission via a data connection. The audio generation module 136 is also shown including a speech synthesis module 538, which may be used to generate simulated speech or access data from a library of recorded speech. The speech synthesis module 538 may include any manner of sound generation software, one or more libraries of prerecorded sounds or other audio data, text-to-speech software, and so forth. In some implementations, the speech synthesis module 538 may include software usable to affect the tone of produced audio data to simulate an emotional state of synthesized speech.

The authentication module 140 may be used to identify portion(s) of the user information 120 having security flags 218 associated therewith or portion(s) of user information 120 having an associated flag, category, classification, or format that may indicate that the portion(s) of the user information 120 are confidential information. The authentication module 140 may also be used to receive and store verification data 540, including, but not limited to, a user-supplied password, gesture, fingerprint, facial image, audio speech or voice profile data, or similar types of data. In one implementation, when the user information processing module 134 determines a portion of the user information 120 that corresponds to a request for information from an IVR system 104, and the authentication module 140 determines the portion of the user information 120 to be confidential or to have an associated security flag 218, the authentication module 140 may actively or passively obtain authentication data from a user device 102. For example, a prompt may be provided to a user device 102 from a server 116 requesting input of a password, gesture, fingerprint, image, or vocal response. The authentication data may also be obtained passively, such as through facial recognition using one or more cameras 110. The obtained authentication data may be compared with the verification data 540 to determine a match prior to providing portions of the user information 120 determined to be confidential to an IVR system 104 or other external party.

Other modules 542 including, but not limited to, an encryption module, modules for interacting with a GPS device or similar location sensors, a password management module, a module for querying a list of contacts associated with the user device 102, and so forth, may be present in the memory 524. Other data 544 may also be present in the data store 528. For example, the other data 544 may include a list of contacts associated with the user device 102 or one or more passwords for use with a password management module. In one implementation, the other data 544 may include a calendar or list of tasks associated with a user device 102. For example, the user information 120 may include both a home telephone number and a work telephone number associated with the user 302. Responsive to a request for the most appropriate time to contact a user 302, the user information processing module 134 may query the calendar or list of tasks to determine a date and time and generate a response using the determined date and time. The user information processing module 134 may also determine where the user 302 may be located during that date and time and provide either the home telephone number or work telephone number using that determination.

For example, the user device 102 may receive a communication, such as a telephone call, from a human operator or an automated system. A calendar or list of tasks associated with the user device 102 may indicate that the user 302 is not currently available. The user information processing module 134 may query the calendar or list of tasks to determine a date and time at which the user 302 may be available and cause automatic generation of a response containing the determined date and time, such as through use of the audio generation module 136. In other implementations, the user device 102 may receive audio data 132 containing a request for an appropriate time to contact the user 302. The audio processing module 130 may determine the request for information from the audio data 132. Responsive to the request for information, the user information processing module 134 may query the calendar or list of tasks and cause generation of a response.

In some implementations, the other input devices 520 may include one or more location sensors, health sensors, motion or orientation sensors, and so forth. Location sensors may include radio navigation-based systems, satellite-based navigational systems, and so forth. Health sensors may include a heart or pulse monitor, respiration monitor, pedometer, and so forth. More motion or orientation sensors may include an accelerometer, gyroscope, and so forth. The other modules 542 may include appropriate instructions for receiving and storing data from each of the other input devices 520. For example, status information, such as a current location of a device, weather conditions at the location of a device, the duration of time a device has occupied a location, emergent situations at the location of a device, physical features or available services proximate to the location of a device, or health information associated with a user 302 of a device may be processed and stored as user information 120. The user information processing module 134 may then determine whether any items of status information obtained using the other input devices 520 corresponds to a received request for information. For example, when communicating with medical or emergency response personnel, automated communication of the current location of a user device 102 and any emergent health conditions or vital signs of a user 302 may be a suitable response to a received request for information. A user 302 in medical distress may initiate a call to emergency personnel by dialing 911, and responsive to a verbal question regarding the nature of the emergent situation, an automated audio response containing health information may be provided. For example, an apparent cardiac event may be determined from a heart monitor associated with the user device 102. Furthermore, responsive to a request for the location of the user 302, the current location of the user device 102, as determined by GPS or other location sensors, may also be provided. Similarly, when communicating with delivery personnel or other types of businesses, the current location of a device and weather information at that location may be relevant.

In other implementations, different computing devices 500 may have different capabilities or capacities. For example, the server 116 may have significantly more processor 504 capability and memory 524 capacity compared to the user device 102. In another example, the user device 102 may contain devices configured to render the user device 102, or portions thereof, inoperable. For example, the user device 102 may contain anti-tamper mechanisms configured to render the user device 102 unusable should someone fail to successfully provide authentication data that matches the verification data 540, to disassemble the user device 102, or to otherwise attempt to subvert the computer executable instructions thereon.

Figure 6:
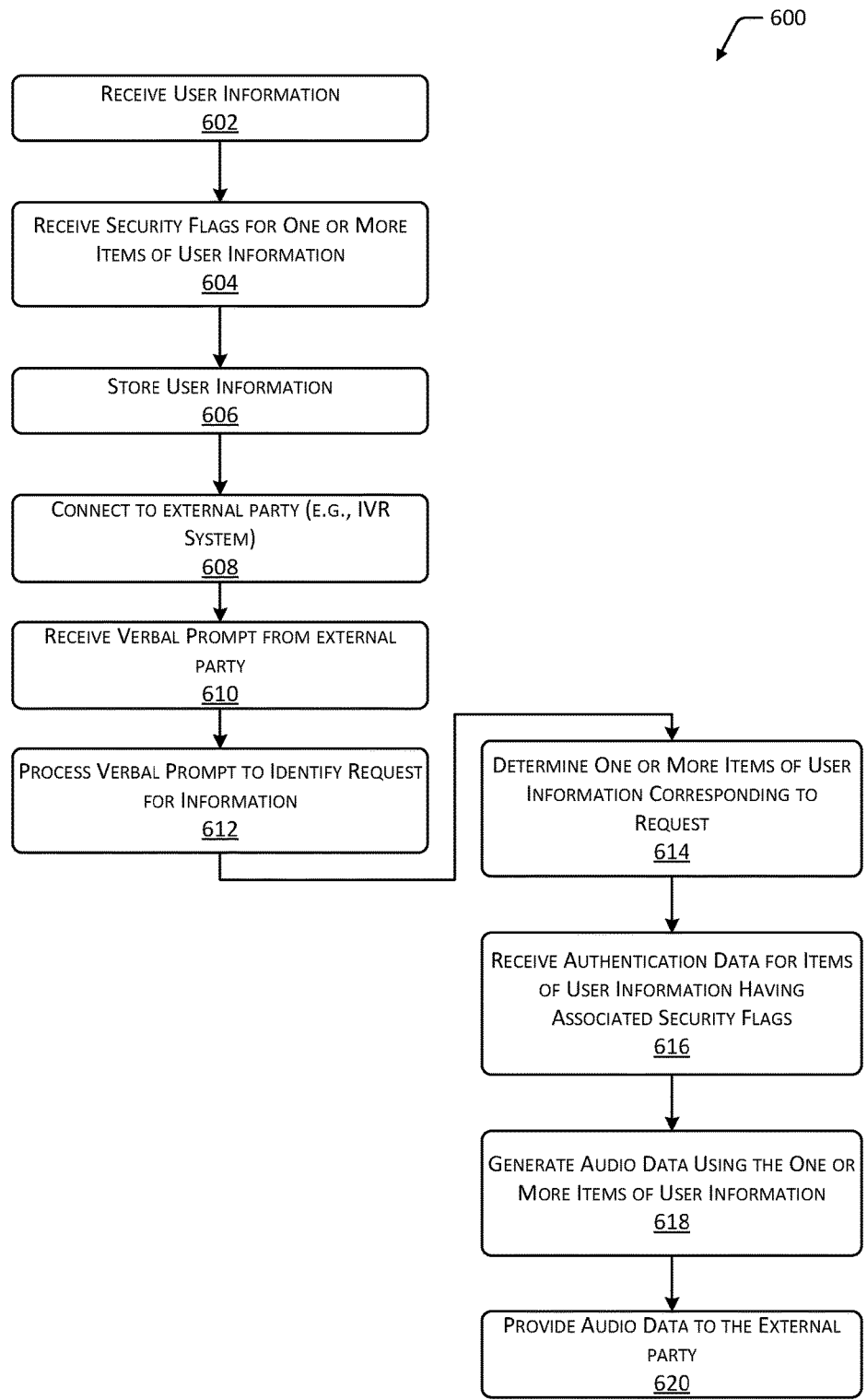
FIG. 6 is a flow diagram illustrating a process usable to provide items of user information in the form of audio data, responsive to verbal prompts from an IVR system.

FIG. 6 is a flow diagram depicting an illustrative process 600, usable to provide items of user information 138 in the form of audio data 132, responsive to verbal prompts from an IVR system 104. Block 602 receives user information 120, which may be input using a touchscreen 106, button 108, camera 110, microphone 112, and so forth, of a user device 102. The user information receipt/storage module 124 may include instructions executable by a processor 504 to operate the touchscreen 106 or other output devices 522 to display an interface including, but not limited to, a keyboard, fillable fields, and menus, to facilitate the receipt of input from a user device 102 and to process information received via such an interface.

Block 604 receives security flags 218 for one or more items of user information 120. Security flags 218 may be input contemporaneously with the user information 120 by the user device 102. In some implementations, one or more items of user information 120 may be categorized by the user device 102, the user information receipt/storage module 124, or authentication module 140 as a type of data with which a security flag 218 may be automatically associated.

Block 606 stores the user information 120. The user information 120 may be stored in a data store 528. The manner in which the user information 120 is stored, arranged, or categorized for future access may be determined by the user information receipt/storage module 124.

Block 608 connects to an external party such as an IVR system 104. The connection between the user device 102 and the external party may include any type of connection usable to transmit and receive data. Communication between the user device 102 and the external party may be initiated by the user device 102 or external party. In some implementations, the act of connecting to the external party may include accessing an existing connection. For example, the user device 102 may initiate a telephone call, a VoIP call, a video chat interface, a text-based chat interface, a web browser, or a data connection to an IVR system 104. In some implementations, the user device 102 and external party may be accessible to one another via an existing network connection, and the user device 102, IVR system 104, or other device associated with the external party may be used to access the network connection. The user device 102 and external party may be capable of multiple modalities of communication.

Block 610 receives a verbal prompt from the external party. For example, the audio data 132 transmitted between an IVR system 104 and the user device 102 may include a verbal prompt. Block 612 processes the verbal prompt to identify a request for information. Processing of data received from the external party may be performed by the audio processing module 130 to identify a portion of a body of data from the body of data as a whole through speech recognition, translation, or execution of speech-to-text or natural language processing software or other types of software.

Block 614 determines one or more items of user information 120 that corresponds to the request for information. In some implementations, the user information 120 may be flagged, categorized, or otherwise organized in a manner that enables access and retrieval of portions responsive to a request for information. In some implementations, the user information 120 may be queried by searching the user information 120 for specific terms, such as alphanumeric strings, a specific size, a specific length, a range of sizes or lengths, or one or more formats, to identify portions thereof responsive to the request for information. This process may be performed by executing the user information processing module 134.

Block 616 receives authentication data for items of user information 120 that have security flags 218 associated therewith. For example, the authentication module 140 may identify at least one security flag 218 associated with an item of user information and provide a request for authentication data to an output device, such as the touchscreen 106 or the speaker 114. Responsive to the request, the user device 102 may be used to provide at least one item of authentication data, such as a password, gesture, fingerprint, and so forth. The received authentication data may be processed and verified by comparing the received authentication data with existing verification data 540 or expected authentication data to determine a match. If the authentication process is successful, the item(s) of data having an associated security flag 218 may be provided to the IVR system 104.

Block 618 generates audio data 132 using the one or more items of user information 120 that corresponds to the request for information. Generation of audio data 132 may be performed by executing the audio generation module 130, which may include any manner of speech synthesis, text-to-speech, or DTMF encoding software usable to generate sounds including, but not limited to, synthesized voices, recorded voices, and DTMF tones. It should be understood that in some implementations, one or more items of user information 120 may be input as audio data 132, such as DTMF tones or recorded speech input by a user 302, and the process of "generating" audio data 132 may include accessing existing audio data 132.

Block 620 provides the audio data 132 to the external party. For example, the audio data 132 may be transmitted between the user device 102 and an IVR system 104 by the connection module 126.

Figure 7:
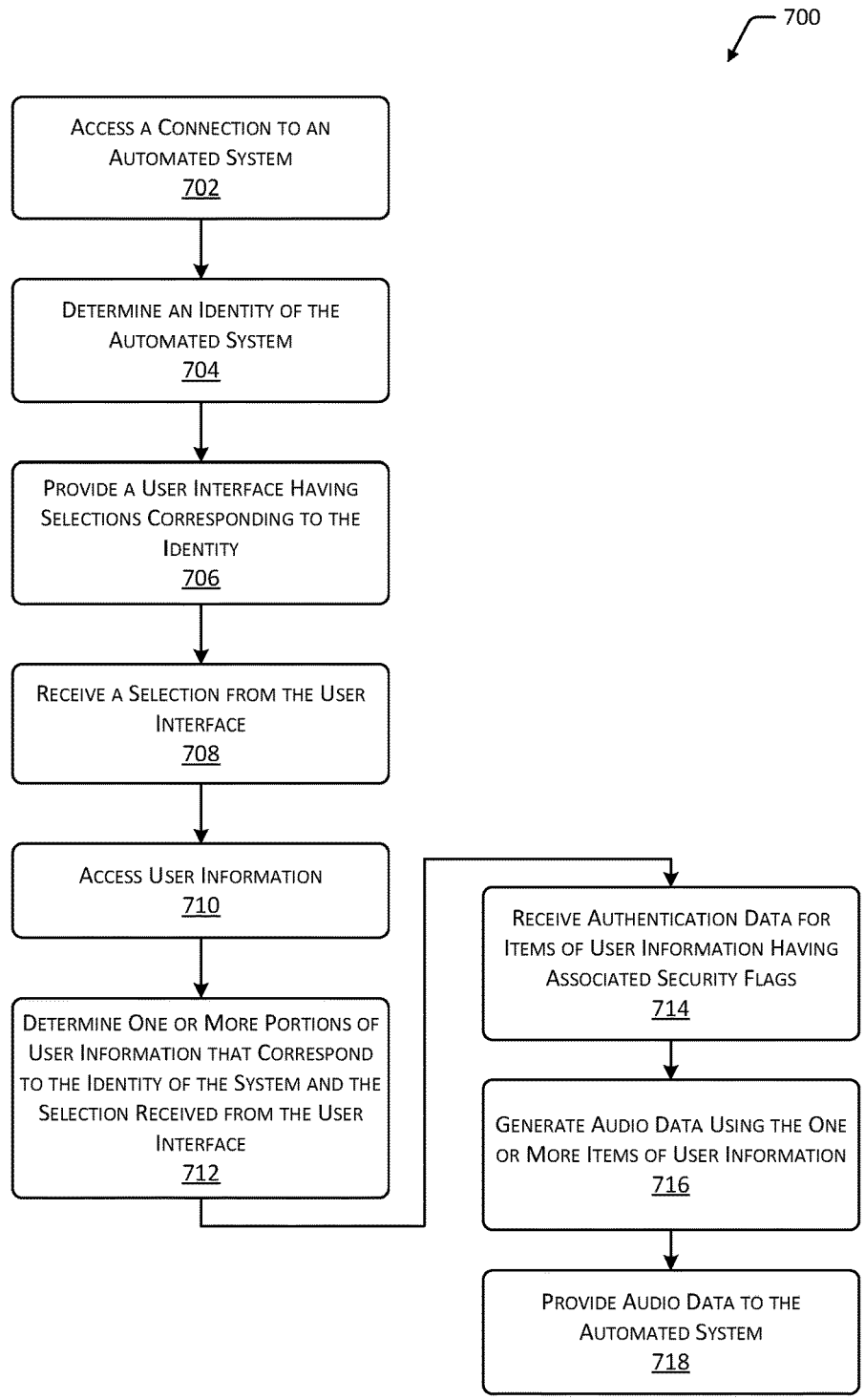
FIG. 7 is a flow diagram illustrating a process usable to provide items of user data to an IVR system responsive to selections received from a user interface.

FIG. 7 is a flow diagram illustrating a process 700 usable to provide items of user data to an automated system, such as an IVR system 104 or other external party, responsive to selections received from a user interface. Block 702 accesses a connection to an automated system. In some implementations, a user device 102 may be used to initiate a connection with an automated system, or an automated system may be used to initiate a connection with a user device 102. In other implementations, the user device 102 or automated system may be used to access an existing connection between the user device 102 and automated system. The connection with the automated system may include a telecommunication connection, a VoIP or data connection, or any other manner of direct or networked connection.

Block 704 determines an identity of the automated system. In some implementations, an automated system may provide an identity in the form of a signal that may be recognized by a user device 102 or in the form of audio data 132 that may be recognized by an audio processing module 130. In other implementations, the identity of the automated system may be determined by a user device 102, such as through processing of a telephone number, network address, or other data to communicate with the automated system.

Block 706 provides a UI having selections corresponding to the identity of the automated system. As illustrated in FIGS. 3 and 4, user information 120 from multiple users 302, the specific user 302 accessing the automated system, and information regarding the automated system itself, may be recorded and used to determine various selections for inclusion in a UI. For example, as shown in FIG. 4, a list of resolutions 314 most commonly sought by users 302 accessing an automated system may be provided on the UI. Block 708 receives a selection from the UI.

Block 710 accesses user information 120 for subsequent processing using the identity of the automated system and the selection from the UI. Block 712 determines one or more portions of the user information 120 that correspond to the identity of the automated system and to the selection received from the UI. For example, when the identity of an automated system and a sequence of responses to obtain a specific resolution 314 from the automated system are known, portions of the user information 120 that correspond to the known or expected sequence of requests may be determined. As such, even though the determined portions of user information 120 were determined based on the identity of the automated system and the selection from the UI, the portions of the user information 120 may also be responsive to audio data 132 received from the automated system. In some implementations, audio data 132 received from the automated system may be processed to determine one or more irregularities in the received data by comparing the received audio data 132 to a stored body of expected audio data. For example, if an automated system has been modified and the audio data 132 and sequence of responses necessary to achieve a specific resolution 314 from the automated system have changed, processing of the received audio data may identify the changed audio data and refrain from providing user information 120 that may not be responsive to the changed audio data.

After determining portions of user information 120 that correspond to the identity of the automated system and the selection received from the UI, block 714 receives authentication data for items of user information 120 having associated security flags 218.

Block 716 generates audio data 132 using the one or more items of user information 120. Block 718 provides the audio data 132 to the automated system.

Figure 8:
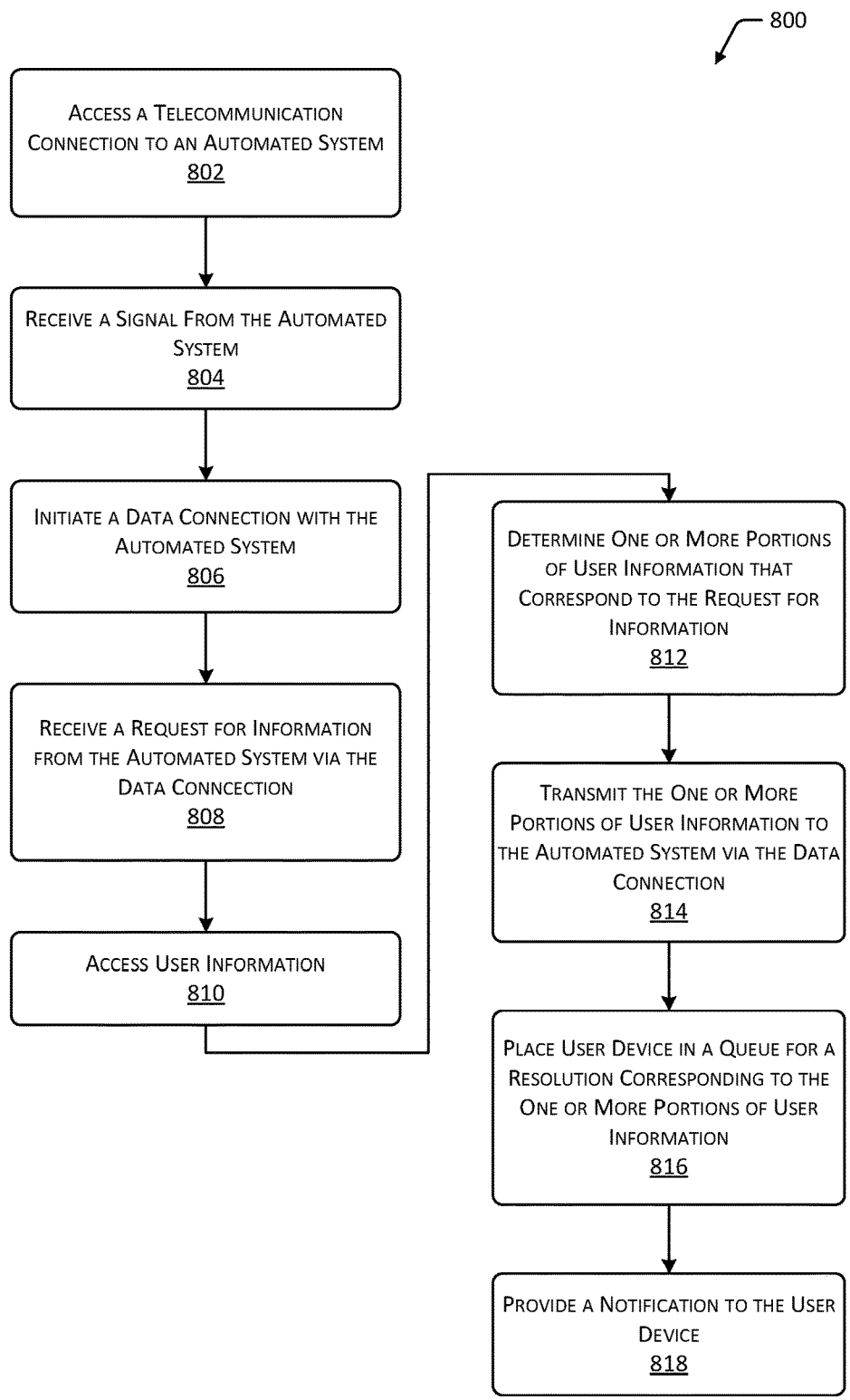
FIG. 8 is a flow diagram illustrating a process usable to provide items of user data to an IVR system using a data connection prior to notifying a user of a resolution.

FIG. 8 depicts a flow diagram illustrative process 800 usable to provide items of user data to an automated system, such as an IVR system 104 or other type of external party, using a data connection prior to notifying a user of a resolution. Block 802 accesses a telecommunication connection to an automated system. Block 804 receives a signal from the automated system. In some implementations, the signal received is an in-band telecommunication signal that includes information indicative of the identity of the automated system. For example, a DTMF tone or other sound may be included with the audio data 132 provided by the external party. A user device 102 may receive this DTMF tone or other sound, determine the identity of the automated system, and send a responsive signal. In other implementations, an out-of-band signal, by way of another communication connection or channel, may be received.

Block 806 initiates a data connection with the automated system. A data connection may include a network-based connection, separate and out-of-band from the telecommunication signal and may enable an efficient exchange of information between a user device 102 and the automated system in the form of signal-based data, without requiring the processing and generation of audio data 132.

Block 808 receives a request for information from the automated system via the data connection. Block 810 accesses the user information 120 for subsequent processing. Block 812 determines one or more portions of the user information 120 that corresponds to the request for information.

Block 814 transmits the one or more portions of user information 120 to the automated system, via the data connection. In various implementations, a user 302 may be prompted to provide authentication data prior to providing one or more items of user information 120.

Block 816 places the user device 102 in a queue for a resolution 314 corresponding to the portions of user information 120 provided to the automated system. For example, via the data connection, an automated system may provide sequential requests for information, responsive to which a user device 102 may provide one or more items of user information 120. Once the automated system has received sufficient information to route the user's communication to a resolution 314, the data connection may be terminated, and the user device 102 may be placed in a queue for the corresponding resolution 314.

Block 818 provides a notification to the user device 102, such as a vibration, an audible sound, or a visual effect. In some implementations, the notification may be provided once the data connection is terminated and the user device 102 is placed in a queue for a resolution. In other implementations, the notification may be provided responsive to receipt of audio data, a change in audio data that is received, or receipt of a signal. For example, when the user device 102 is no longer in a queue, and a human operator speaks, receipt of the audio data corresponding to the human operator's speech may trigger provision of the notification to the user device 102.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program may be configured to access, including signals transferred by one or more networks. For example, the transitory machine-readable signal may comprise transmission of software by the Internet.

Separate instances of these programs may be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as forms of implementing the claims.

What is claimed is:

1. A system comprising:
   one or more memories storing computer-executable instructions; and
   one or more hardware processors to execute the computer-executable instructions to:
   receive user input indicative of an automated system;
   access a network-based data connection with the automated system, wherein the network-based data connection is out-of-band relative to a telecommunication connection with the automated system;
   receive one or more requests for information, via the network-based data connection, from the automated system;
   determine, using the one or more hardware processors, correspondence between user data and at least a subset of the one or more requests;
   provide, using the one or more hardware processors, at least a first portion of the user data that corresponds to the at least a subset of the one or more requests, via the network-based data connection, to the automated system;
   initiate the telecommunication connection with the automated system; and
   generate a notification indicative of one or more of initiation of the telecommunication connection or data received via the telecommunication connection.

2. The system of claim 1, further comprising computer-executable instructions to:
   determine a location of a user device;
   determine one or more automated systems based on the location of the user device; and
   present a user interface including at least a subset of the one or more automated systems;

wherein the user input includes an indication of the automated system within the user interface.

3. The system of claim 1, further comprising computer-executable instructions to:
determine one or more of a browsing history, a search history, or a purchase history based at least in part on the user data;
determine one or more automated systems based on the one or more of the browsing history, the search history, or the purchase history; and
present a user interface including at least a subset of the one or more automated systems;
wherein the user input includes an indication of the automated system within the user interface.

4. The system of claim 1, further comprising computer-executable instructions to:
determine one or more contacts based at least in part on the user data;
determine one or more automated systems based on the one or more contacts; and
present a user interface including at least a subset of the one or more automated systems;
wherein the user input includes an indication of the automated system within the user interface.

5. The system of claim 1, wherein the telecommunication connection is initiated subsequent to providing the at least a first portion of the user data to the automated system, and wherein the telecommunication connection is initiated in response to one or more of: providing the at least a first portion of the user data to the automated system or receiving a signal from the automated system.

6. The system of claim 1, further comprising computer-executable instructions to:
determine an identity of the automated system based at least in part on one or more of the user input or a signal received from the automated system;
determine correspondence between the user data and the identity; and
provide at least a second portion of the user data that corresponds to the identity, via the network-based data connection, to the automated system.

7. The system of claim 1, further comprising computer-executable instructions to terminate the network-based data connection proximate to initiation of the telecommunication connection.

8. The system of claim 1, further comprising computer-executable instructions to:
determine a change in audio data received via the telecommunication connection;
wherein the notification is provided responsive to the change in the audio data.

9. A method comprising:
accessing a data connection with an automated system, wherein the data connection is out-of-band relative to a telecommunication connection with the automated system;
determining an identity of the automated system;
determining, using one or more computing devices, correspondence between the identity and user data, wherein the user data associates identities of automated systems with respective portions of the user data;
based on the correspondence between the identity and the user data, using the one or more computing devices to automatically provide at least a first portion of the user data, via the data connection, to the automated system; and
receiving a first signal from the automated system; and
initiating the telecommunication connection responsive to the first signal from the automated system.

10. The method of claim 9, further comprising receiving a second signal, via the data connection, from the automated system, wherein the second signal is indicative of the identity of the automated system.

11. The method of claim 9, further comprising receiving an in-band telecommunication signal, via the telecommunication connection, from the automated system, wherein the in-band telecommunication signal is indicative of the identity of the automated system.

12. The method of claim 9, further comprising:
determining a user device characteristic including one or more of: a location of a user device, a purchase history associated with the user device, a browsing history associated with the user device, a search history associated with the user device, or one or more contacts associated with the user device;
determining one or more automated systems based at least in part on the user device characteristic;
presenting a user interface indicating at least a subset of the one or more automated systems; and
receiving user input indicative of the automated system via the user interface.

13. The method of claim 9, further comprising:
receiving one or more requests, via the data connection, from the automated system;
determining correspondence between the one or more requests and the user data; and
based on the correspondence between the one or more requests and the user data, providing at least a second portion of the user data, via the data connection, to the automated system.

14. The method of claim 9, further comprising:
receiving, via the telecommunication connection, audio data indicative of a human voice; and
generating a notification responsive to the audio data.

15. The method of claim 9, further comprising:
receiving audio data via the telecommunication connection;
determining a change in the audio data; and
generating a notification responsive to the change in the audio data.

16. A system comprising:
one or more memories storing computer-executable instructions; and
one or more hardware processors to execute the computer-executable instructions to:
access a data connection with an automated system, wherein the data connection is out-of-band relative to a telecommunication connection;
determine, using the one or more hardware processors, correspondence between user data and one or more of a request from the automated system or an identity of the automated system;
provide, using the one or more hardware processors, at least a portion of the user data that corresponds to the one or more of the request or the identity, via the data connection, to the automated system;
initiate a telecommunication connection;
receive audio data via the telecommunication connection; and
responsive to one or more of initiation of the telecommunication connection, receipt of the audio data via the telecommunication connection, or a change in the audio data received via the telecommunication connection, generate a notification.

17. The system of claim 16, further comprising computer-executable instructions to:
- determine a user device characteristic including one or more of: a location of a user device, a purchase history associated with the user device, a browsing history associated with the user device, a search history associated with the user device, or one or more contacts associated with the user device; and
- determine the automated system based at least in part on the user device characteristic;
- wherein the data connection is accessed responsive to determination of the automated system.

18. The system of claim 16, further comprising computer-executable instructions to:
- present a user interface indicating one or more automated systems;
- receive user input indicating the automated system, wherein the data connection is accessed responsive to the user input; and
- determine the identity of the automated system based at least in part on the user input.

19. The system of claim 16, further comprising computer-executable instructions to:
- present a user interface indicative of the request from the automated system; and
- receive user input indicating the at least a portion of the user data;
- wherein the at least a portion of the user data is provided responsive to the user input.

20. The system of claim 16, further comprising computer-executable instructions to:
- present a user interface indicative of the request from the automated system; and
- receive user input providing additional user data associated with the request;
- wherein the at least a portion of the user data that corresponds to the request includes the additional user data.

* * * * *